(12) United States Patent
Hale, III

(10) Patent No.: US 7,713,562 B2
(45) Date of Patent: May 11, 2010

(54) ANIMAL FEED AND METHODS FOR REDUCING AMMONIA AND PHOSPHORUS LEVELS IN MANURE

(75) Inventor: Edward Carroll Hale, III, 487 N. Walnut, Franklin, IN (US) 46131

(73) Assignees: Rose Acre Farms, Inc., Seymour, IN (US); Edward Carroll Hale, III, Roanoke, VA (US)

(*) Notice: Subject to any disclaimer, the term of this patent is extended or adjusted under 35 U.S.C. 154(b) by 1296 days.

(21) Appl. No.: 10/868,070

(22) Filed: Jun. 15, 2004

(65) Prior Publication Data

US 2005/0053700 A1 Mar. 10, 2005

Related U.S. Application Data

(60) Provisional application No. 60/499,988, filed on Sep. 4, 2003, provisional application No. 60/541,500, filed on Feb. 3, 2004, provisional application No. 60/541,622, filed on Feb. 4, 2004.

(51) Int. Cl.
A23K 1/175 (2006.01)

(52) U.S. Cl. .......................... 426/271; 426/69; 426/74; 426/635; 426/805; 426/807

(58) Field of Classification Search ................. 426/69, 426/74, 635, 807, 805, 271
See application file for complete search history.

(56) References Cited

U.S. PATENT DOCUMENTS

| | | | |
|---|---|---|---|
| 3,575,852 A * | 4/1971 | Hughes | 210/667 |
| 3,857,946 A | 12/1974 | Shibata | |
| 4,089,975 A * | 5/1978 | Wade et al. | 514/594 |
| 4,248,728 A * | 2/1981 | Puryear | 510/368 |
| 4,306,516 A | 12/1981 | Currey | |
| 4,393,082 A | 7/1983 | White et al. | |
| 4,437,429 A | 3/1984 | Goldstein et al. | |
| 4,556,564 A | 12/1985 | Laurent et al. | |
| 4,610,882 A | 9/1986 | Laurent et al. | |
| 4,636,409 A * | 1/1987 | Arai et al. | 427/256 |
| 4,663,194 A * | 5/1987 | Wixon | 510/356 |
| 4,862,829 A | 9/1989 | Laurent et al. | |
| 4,873,097 A | 10/1989 | Laurent et al. | |
| 4,879,121 A | 11/1989 | Laurent et al. | |
| 4,908,218 A | 3/1990 | Laurent et al. | |
| 4,944,247 A | 7/1990 | McNish et al. | |
| 4,976,971 A | 12/1990 | Laurent et al. | |
| 5,079,201 A | 1/1992 | Chu et al. | |
| 5,140,949 A | 8/1992 | Chu et al. | |
| 5,252,345 A * | 10/1993 | Hu et al. | 424/684 |
| 5,314,700 A | 5/1994 | Barnes et al. | |
| 5,314,852 A * | 5/1994 | Klatte | 502/60 |
| 5,325,816 A | 7/1994 | Pattengill et al. | |
| 5,443,979 A | 8/1995 | Vanderbeke et al. | |
| 5,562,916 A | 10/1996 | Van Ooijen | |
| 5,908,634 A | 6/1999 | Kemp et al. | |
| 5,935,635 A * | 8/1999 | Mori et al. | 426/656 |
| 6,004,614 A * | 12/1999 | Kempen | 426/635 |
| 6,045,834 A | 4/2000 | Howes et al. | |
| 6,168,803 B1 * | 1/2001 | Harris et al. | 424/442 |
| 6,548,282 B2 | 4/2003 | Kondo et al. | |
| 2003/0003203 A1 | 1/2003 | Williams | 426/332 |
| 2004/0197384 A1 | 10/2004 | McGrane | 424/442 |
| 2005/0053700 A1 | 3/2005 | Hale, III | |

FOREIGN PATENT DOCUMENTS

| | | | |
|---|---|---|---|
| GB | 2 319 030 A | | 5/1998 |
| JP | 49064253 A | * | 6/1974 |
| JP | 2004321033 | * | 11/2004 |
| KR | 2003-0016782 | | 3/2003 |
| KR | 3016782 A | * | 3/2003 |
| RU | 2146475 C1 | | 3/2000 |
| WO | WO 92/16114 A | | 10/1992 |
| WO | WO 02/41703 | | 5/2002 |

(Continued)

OTHER PUBLICATIONS van Kempen, "Livestock and Poultry Environmental Stewardship (LPES) Curriculum", article downloaded from http://web.archive.org/web/20020314161801/http://www.lpes.org/les_plans.html., Mar. 2002, 15 pages.*

Mumpton et al. J. Anim. Sci. 1977, vol. 45, pp. 1188-1203.*

M. D. Olver, British Poultry Science, 1466-1799, vol. 30, Issue 1, 1989, pp. 115-121.*

(Continued)

Primary Examiner—C. Sayala
(74) Attorney, Agent, or Firm—Woodard, Emhardt, Moriarty, McNett & Henry LLP

(57) ABSTRACT

An animal feed is provided that employs a substantially indigestible cation exchanger capable of binding ammonium cations and an acidogenic substance to acidify an animal's manure and thereby create ammonium cations that can be bound by the cation exchanger. The animal feed reduces ammonia emissions from manure produced by animals fed the animal feed compared to the emissions obtained from manure when an acidogenic substance is fed alone and compared to the emissions obtained from manure when a cation exchange capacity material is fed alone. According to another aspect of the present invention, a method of lowering ammonia emissions from manure is provided. The present invention also provides a method for reducing soluble phosphorus levels in manure and a method for reducing total phosphorus levels in manure. In a further aspect of the present invention, a method is provided that yields manure that may be used alone or in concert with other materials to act as a fertilizer having advantageous ecological properties. Another aspect of the present invention provides a method for reducing insect populations associated with manure.

23 Claims, 5 Drawing Sheets

OTHER PUBLICATIONS

Nakaue, H.S. J.K. Koelliker. 1981. "Studies with clinoptilolite in poultry. I. Effect of feeding varying levels of clinoptilolite (zeolite) to dwarf single comb white Leghorn pullets and ammonia production." Poultry Sci. 60:944-949.*

Shurson G C et al.: "Effects of Zeolite or Clinoptilolite in Diets of Growing Swine" Journal of Animal Science, American Society of Animal Science, US vol. 59, No. 6, Dec. 1, 1984 p. 1536-1545, XP008018449 ISSN: 0021-8812.

* cited by examiner

ANIMAL FEED AND METHODS FOR REDUCING AMMONIA AND PHOSPHORUS LEVELS IN MANURE

This application claims the benefit of U.S. Patent Application Ser. No. 60/499,988 filed on Sep. 4, 2003, U.S. Patent Application Ser. No. 60/541,500 filed on Feb. 3, 2004, and of U.S. Patent Application Ser. No. 60/541,622 filed on Feb. 4, 2004.

FIELD OF THE INVENTION

The invention relates generally to animal feeds and methods of feeding animals that produce more environmentally benign waste products.

BACKGROUND

The number one complaint filed with both state and federal environmental agencies against animal producers involves odors. What is true for animal producers in general is also true for poultry producers. Controlling odors associated with poultry manure is a continuing problem for poultry and egg producers. Aerosol ammonia is one of the primary causes of nuisance odors associated with confined animal feeding operations. Since aerosol ammonia comprises a large portion of the odor associated with poultry litter, measures to control odor at poultry operations should incorporate strategies to reduce ammonia volatilization. In addition to ammonia's role as a component in nuisance odors, high levels of gaseous ammonia adversely affects animal health and the safety of people working in these environments.

Aerosol ammonia levels in hen houses with shallow pits and monthly manure removal have been measured to be in the range of 46 parts per million (ppm). Similarly, the levels of aerosol ammonia in hen houses with deep pits (manure-drying pits where manure is removed annually) have been measured to be in the 46 ppm range. Gaseous ammonia levels are especially high in winter, when hen house ventilation is restricted to conserve heat. During cold weather, gaseous ammonia levels in hen houses often exceed the 46 ppm range.

Poultry, for example, chickens and turkeys, continuously exposed to 20 (ppm) ammonia vapors exhibit significant respiratory tract damage after only six weeks. Chicks exposed to 20 ppm ammonia for 72 hours are much more susceptible to Newcastle Disease than chicks reared in ammonia-free environments. A high level of ammonia in the environment of laying chicken hens is also known to reduce egg production. For a more thorough discussion of the effect of high levels of gaseous ammonia on animal health and production, the reader is directed to the following articles that are incorporated by reference herein in their entirety. See: Avian Dis. 8:369-379, 1964; Deaton et al. Poultry Sci., 63:384-385, 1984; McQuitty et al. Canadian Agricultural Engineering 27:13-19; Strombaugh et al. J. Anim. Sci. 28:844, 1969. Similarly, high ammonia levels correlate with a reduction in the amount of animal feed converted to animal body mass and reduced weight gain in hogs.

In addition to ammonia's adverse effects on animal health, exposure to high levels of aerosol ammonia also adversely impacts human health. For example, exposure to aerosol ammonia concentrations in the range of 25 parts per million (ppm) produces discomfort in workers, and even brief exposures (<5 minutes) to ammonia can cause nasal irritation and dryness. In recognition of the ill effects of aerosol ammonia on human health, both the National Institute for Occupational Safety and Health (NIOSH) and the Occupational Safety and Health Administration (OSHA) identify ammonia as a health hazard. Currently NIOSH rules set the permissible exposure level (PEL) for ammonia over an 8-hour period at 25 ppm. OSHA rules set a PEL, over an 8-hour period, at 50 ppm. OSHA also recognizes that an aerosol ammonia concentration of 300 ppm ammonia is immediately dangerous to life or health (IDLH). 29 C.F.R. 1910.120 (2003) defines IDLH as "[a]n atmospheric concentration of any toxic, corrosive or asphyxiant substance that poses an immediate threat to life or would cause irreversible or delayed adverse health effects or would interfere with an individual's ability to escape from a dangerous atmosphere."

In addition to the problems associated with aerosol ammonia in animal manure, manure often times comprises high concentrations of water-soluble forms of phosphorus. High concentrations of phosphorus can cause environmental problems, especially if the phosphorus finds its way into surface water sources or shallow aquifers. Manures from monogastric animals such as hogs and poultry are especially high in phosphorus due to the inability of monogastric animals to digest phytic acid, a phosphorus-rich compound commonly found in animal feeds. The presence of high levels of soluble phosphates in manure is especially problematic when manure is disposed of by spreading it over fields or when feedlots are located near watersheds or above shallow aquifers. Examples of environmental damage caused by manures high in soluble phosphates include fish kills and bacterial or algal blooms exacerbated by the introduction of phosphates from manure into surface waters.

While plants require phosphorus in order to grow, excess levels of phosphorus can stunt plant growth and in some cases cause plant death. This is especially problematic, as one common means of disposing of manure is to use it to fertilize plants. Accordingly, phosphorus must be provided to plants in amounts conducive to and not detrimental to plant growth and development. When phosphates are provided to plants in amounts that exceed the plants' ability to absorb these compounds, excess phosphates accumulate in the soil or find their way into the watershed.

One widely used measure of fertilizer efficacy is the fertilizer's Nitrogen to Phosphate ratio (N:P ratio). For most plants, a N:P ratio in the 5.8:1 range is acceptable. When the N:P ratio is substantially lower than 5.8:1, a compound may provide more phosphate than plants can readily absorb while providing less nitrogen than the plants require for optimal growth. Off-gassing of ammonia lowers the nitrogen content in manure, thereby decreasing the nitrogen/phosphorus ratio in the manure. Especially if manure is already high in phosphorus, as ammonia is off-gassed the N:P ratio may become so low that the manure must undergo costly processing before it can be used as a fertilizer.

Clearly then, there is a need for methods to produce a manure that exhibits low levels of gaseous ammonia and has a N:P ratio in a range suitable for its ready use as a fertilizer.

SUMMARY OF THE INVENTION

One embodiment of the invention is an animal feed ration that helps to reduce the level of volatile ammonia in manure produced by an animal fed the ration. One embodiment comprises a cation exchanger capable of binding ammonium cations and an acidogenic compound, wherein the acidogenic compound lowers the pH of the manure produced by an animal fed the animal feed such that ammonia in the manure is protonated to produce ammonium cations. A variation of this embodiment includes a level of crude protein reduced relative to a conventional feed. In one variation of this embodiment, the reduced crude protein feed is supplemented with at least one at least partially purified amino acid.

Another embodiment is a method of reducing the level of ammonia aerosol from manure, comprising the steps of providing an animal feed including a cation exchanger capable of binding ammonium cations and an acidogenic compound and feeding the animal feed to an animal. The acidogenic compound is present in one variation of this embodiment such that the initial pH of the animals' excreta is reduced to a pH of ≦9.3. In another variation of this embodiment, the pH is reduced to <7.

Still another embodiment is a method of producing manure comprising the steps of providing a feed ration including a cation exchanger capable of binding ammonium cations and an acidogenic compound capable of reducing the pH of the manure and feeding the feed ration to an animal. At least a portion of the ammonia in manure produced by animals fed these rations is protonated to form ammonium cations that bind to the cation exchanger.

Another embodiment is a fertilizer comprising manure produced by an animal fed a ration including a cation exchanger capable of binding ammonium cations and an acidogenic compound that reduces the pH of the manure.

Another embodiment is a method for controlling the number of insects associated with manure. The method comprises the steps of providing a feed ration including a cation exchanger capable of binding ammonium cations and an acidogenic compound capable of reducing the initial pH of the manure produced by an animal fed the feed ration and feeding the feed ration to an animal. At least a portion of the ammonia in the manure is protonated to form ammonium cations that bind to the cation exchanger.

Another embodiment comprises an animal feed including a cation exchanger capable of binding ammonium cations and an acidogenic compound, wherein the acidogenic compound lowers the pH of the manure produced by an animal fed the animal feed such that ammonia in the manure is protonated to produce ammonium cations. In this embodiment, the manure has a substantially lower level of aerosol ammonia than manure produced by an animal fed a conventional industry standard diet.

A further embodiment of the present invention comprises a method of reducing the level of ammonia aerosol from manure. The method comprises the steps of providing an animal feed including a cation exchanger capable of binding ammonium cations and an acidogenic compound capable of reducing the pH of manure produced by an animal fed the animal feed and feeding the animal feed to an animal. At least a portion of the ammonia in the manure is protonated to form ammonium cations that bind to the cation exchanger. In this embodiment, the animal feed reduces the pH of the manure produced by the animal fed the animal feed compared to a pH expected from a manure produced by the animal when it is fed a conventional industry standard animal feed. The animal feed in this embodiment also increases the amount of ammonium cations protonated from the ammonia in the manure produced by the animal fed the animal feed compared to an amount of ammonium cations protonated from ammonia in a manure produced by the animal when it is fed a conventional industry standard diet.

Yet another embodiment is a method for reducing the level of soluble phosphorus in manure comprising the steps of providing an animal feed including a cation exchanger capable of binding ammonium cations, an exchangeable phosphate reactive metal associated with the cation exchanger, and an acidogenic compound and feeding the animal feed to an animal. The animal manure produced by this method has lower levels of soluble phosphorus than manure produced by the animal fed the conventional industry-standard animal feed. In still another embodiment, the phosphate reducing feed further includes compounds that reduce the amount of phosphate in the manure. Compounds such as phytase reduce the amount of phosphate in the manure by making more phosphate bioavailable for incorporation into animal tissue and products.

Another embodiment is a fertilizer comprising manure produced by an animal fed a ration including a cation exchanger capable of binding ammonium cations and an acidogenic compound. The acidogenic compound is present in the ration such that at least a portion of the ammonia in the manure is protonated to form ammonium cations. Fertilizer made from manure produced by the animal fed the inventive ration has a more favorable (higher) N:P ratio than similarly produced fertilizer made using manure produced by animals fed a conventional industry standard diet.

Still another embodiment is a method for controlling the number of insects associated with manure comprising the steps of providing a feed ration including a cation exchanger capable of binding ammonium cations and an acidogenic compound and feeding the feed ration to an animal. The acidogenic compound reduces the pH of manure produced by an animal fed the animal feed the ration such that at least a portion of the ammonia in the manure is protonated to produce ammonium cations. The manure produced by the animal fed the feed ration reduces the number of insects associated with the manure from a number of insects associated with a manure produced by the animal fed a conventional industry-standard feed ration.

In still another embodiment, an animal ration is amended to produce a first manure produced by an animal fed said amended animal ration, said first manure having a high N:P ratio relative to a second manure produced by said animal fed a conventional industry standard diet. The inventive amended animal ration includes means for lowering a total amount of crude protein in the amended animal ration relative to a total amount of crude protein contained in the conventional industry standard diet; means for lowering a volatile ammonia content of the first manure relative to a volatile ammonia content of the second manure; means for increasing an amount of bio-available phosphorus in the amended animal ration relative to an amount of bio-available phosphorus contained in the conventional industry standard diet; and means for reducing a total amount of phosphorus in the amended animal ration relative to a total amount of phosphorus contained in the conventional industry standard diet.

DESCRIPTION OF THE PREFERRED EMBODIMENTS

Figure 1:
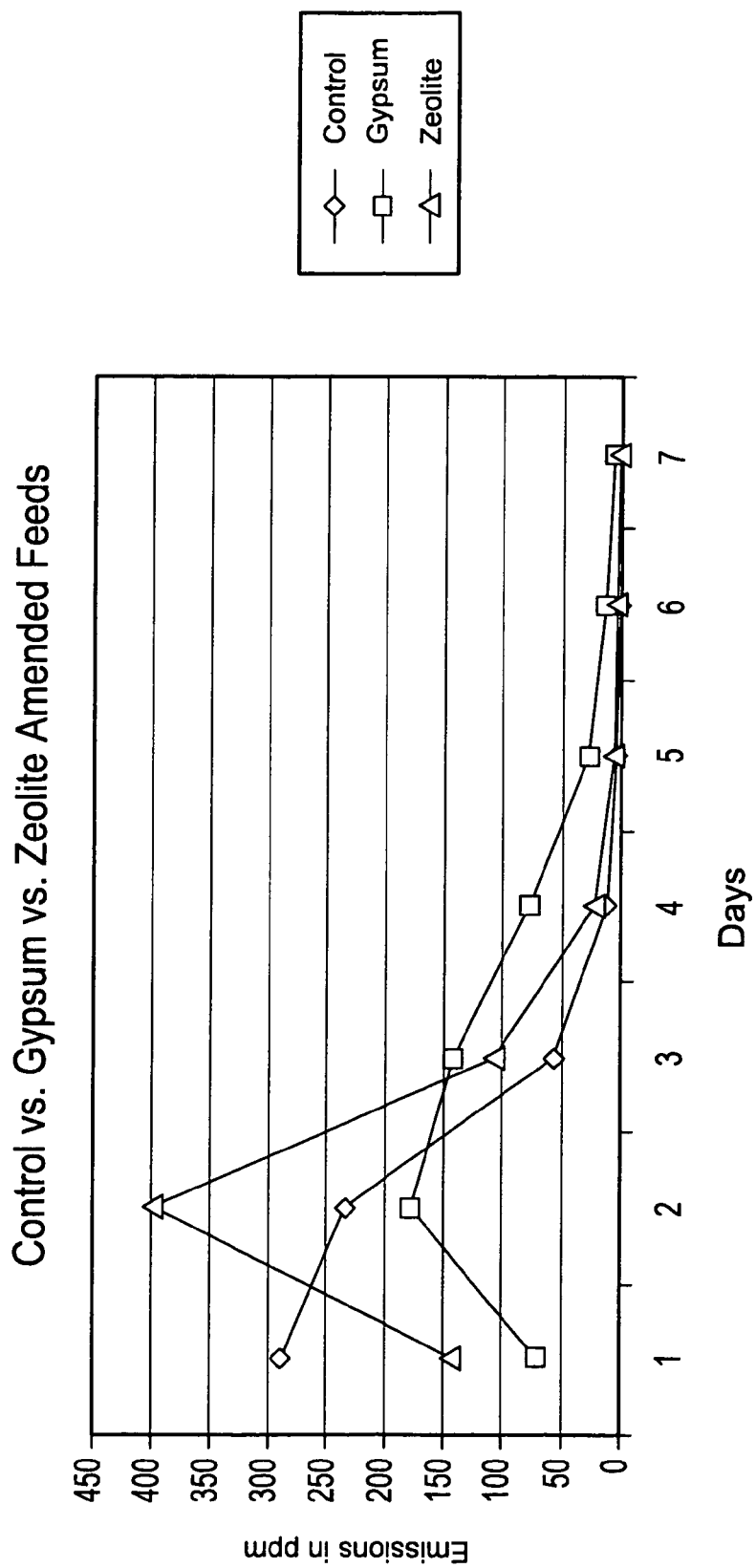
FIG. 1 is a graph of ammonia emissions measured from hen manure samples. These data were collected over a 7-day period and are reported in units of parts per million (ppm). Briefly, manure samples were taken from chicken hens fed one of the following three feed rations: a.) a control feed ration identical to an industry standard feed, wherein the control ration included 18.8% crude protein by weight and 4.2% calcium by weight; b.) a feed ration similar to the control feed ration but supplemented with calcium sulfate (gypsum) such that gypsum provided 45% of the calcium in the feed; and c.) a feed ration similar to the control feed ration supplemented with 2% by weight zeolite.

For the purposes of promoting an understanding of the principles of the invention, reference will now be made to the preferred embodiments thereof, and specific language will be used to describe the same. It will nevertheless be understood that no limitation of the scope of the invention is thereby intended, such alterations, modifications, and further applications of the principles of the invention being contemplated as would normally occur to one skilled in the art to which the invention relates.

A number of explanations and experiments are provided by way of explanation and not limitation. No theory of how the invention operates is to be considered limiting whether proffered by virtue of description, comparison, or example.

In most cases, the preponderance of nitrogen present in excreta is in the form of urea. Urea present in the urine is a source of the large amount of gaseous ammonia emitted shortly after excretion. Urea in manure is converted to ammonia by urease, an enzyme present in excreta that hydrolyzes urea into ammonia. A set of chemical equations detailing the conversion of urea to ammonia is as follows:

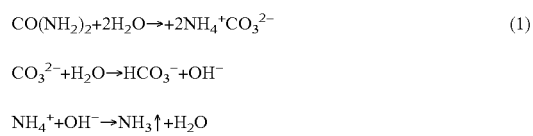

$$CO(NH_2)_2 + 2H_2O \rightarrow + 2NH_4^+ CO_3^{2-} \quad (1)$$

$$CO_3^{2-} + H_2O \rightarrow HCO_3^- + OH^-$$

$$NH_4^+ + OH^- \rightarrow NH_3\uparrow + H_2O$$

As indicated previously, the enzyme urease catalyzes reaction (1). Under acidic conditions, ammonia is readily protonated to form ammonium cations, a less volatile positively charged molecule. Ammonium has a $pK_a$ of about 9.34. Once the pH of the manure becomes high enough, free ammonium will deprotonate to form ammonia, which is more likely to off-gas than is the ammonium cation. Low pH favors ammonium formation, so the presence of acidogenic compounds in manure favors the conversion of ammonia to ammonium. However, as illustrated by the above set of chemical equations, the pH of manure tends to increase over time as urea and other nitrogen containing compounds are converted into ammonia and hydroxyl ions ($OH^-$) are released. The release of hydroxyl anions tends to increase the pH of the manure.

Those of skill in the art will recognize that nitrogen present in undigested amino acids in the manure may provide a source of additional aerosol ammonia emissions. Additional volatile ammonia can form in manure as proteins, amino acids, and other nitrogen-bearing molecules in manure are broken down by either microbial or chemical action. In general, degradation of non-urea nitrogen sources, such as amino acids found in proteins, does not generate large amounts of ammonia at any given time; instead, such degradation facilitates a slow, gradual release of nitrogen.

Reducing the pH of manure can reduce ammonia volatilization, regardless of its immediate source from manure. Ammonium is a weak acid with a $pK_a$ of about 9.34. It behaves more like an alkali earth metal than does ammonia. The pH of manure can be reduced by adding acidogenic compounds to an animal's feed rations. In one embodiment of the invention, acidogenic compounds are compounds that are converted into pH-reducing compounds in an animal's digestive tract. When the pH of manure falls to below the $pK_a$, the equilibrium between uncharged volatile ammonia ($NH_3$) and the less volatile cationic form ammonium ($NH_4^+$) shifts in favor of the production of ammonium cations.

Some acidogenic compounds not only lower the pH of manure they react with ammonium cations to form stable compounds that are not readily converted back to ammonia even as the pH of the milieu increases. Acidogenic compounds that react with ammonium cations to form stable compounds include, but are not limited to, aluminum sulfate (alum), sulfuric acid, and sodium bisulfite. The formation of compounds such as ammonium sulfate reduces the concentration of free ammonium cations in the manure, thereby further shifting the equilibrium between ammonium and ammonia toward the formation of ammonium.

As used herein, the term manure refers to all forms of animal excreta including feces, urine, and uric acid as well as excreta mixed with binders, fillers, absorbents, and the like. Examples of such absorbents include but are not limited to straw, hay, processed paper products, fertilizer components, and the like.

As used herein, the term urine refers to all forms of nitrogen-rich waste processed by the kidneys of an animal. Manure includes, for example, liquids produced by animals such as pig, sheep, cows, etc.; and semi-solid forms as are commonly produced by fowl, including, for example, chickens, ducks, geese, and the like.

As used herein, an acidogenic compound is a compound that can be added to an animal's feed to reduce at least transiently the pH of the animal's manure. One group of acidogenic compounds includes compounds that are digested by an animal to form products that reduce the pH of manure produced by the animal. Still another group of acidogenic compounds substantially survives digestion, and they themselves can be found in the animal's manure acting to reduce the pH of manure. Either type or a combination of both types of acidogenic compounds can be used to practice the invention.

As used herein, the ratio of Nitrogen to Phosphorus may be expressed as either N:P or N/P. Also, as used herein, the term "conventional industry standard diet" and the term "industry standard feed" have substantially similar meanings. These terms refer to animal feeds that generally do not include appreciable amounts of acidogenic compounds or cation exchange materials that are excreted and find their way into manure produced by the animals. Acidogenic compounds and cation exchangers may be added to animal feed in order to reduce the level of ammonia emitted from manure produced by animals fed such diets.

For example, one such conventional industry standard diet is the one recommend by HY-LINE International for W-36 egg producing hens. For a further discussion of this conventional industry standard diet, the reader is directed to "Hy-Line Variety Commercial Management Guide 2003-2004" published by Hy-Line International, West Des Moines, Iowa, U. S. A. and available online at www.hyline.com, which document is incorporated herein by reference in its entirety. Those of ordinary skill in the art will recognize that the conventional industry standard diet varies from species to species, and even within a given species may vary depending upon factors such as variety, age, health, and the utility of the animal.

The reduction in manure pH achieved by supplementing an animal's feed with an acidogenic compound is temporary, generally lasting only between one and three days. Lysine, cellulose, benzoic acid or salts of benzoic acid, or ammonium salts of carboxylic acids are all examples of acidogenic substances. Additional examples of acidogenic compounds that may be added, with varying degrees of success, to animal feed to reduce the pH of manure include salts of mineral acids, such as alkaline earth metal salts of mineral acids. Examples of the latter group of acidogenic substances include, for example, calcium chloride and calcium sulfate (gypsum).

Additionally, certain materials, when added to manure, may inhibit the activity of the enzyme uricase. Uricase acts in concert with other enzymes to convert uric acid in poultry manure to urea. Urea is then converted into ammonia by the enzyme urease. The optimal pH for uricase activity is generally around 9.2 SU. Uricase activity drops off below pH 7 SU and above 10 SU. Reducing the pH of manure below 7 inhibits uricase activity and decreases the amount of ammonia associated with the manure.

Compounds containing zinc, copper, manganese, and magnesium are known to have an inhibitory effect on uricase activity. These metals inhibit uricase activity irrespective of pH. These effect inhibitory effects of low pH and specific metals may be combined by feeding animals mineral acids made from metals that inhibit uricase activity. However, directly feeding animals high levels of salts of such metals may have a detrimental effect on animal health. For this reason, these compounds are often fed as an electrolyte, or as an acidogenic substance fed in concert with other less toxic acidogenic substances.

It may be advantageous to add acidogenic compounds to animal feeds that provide more than just a reduction in pH or the capacity to form stable compounds with ammonia or ammonium cations. For example, acidogenic compounds such as calcium sulfate and calcium chloride provide the animal with a source of calcium and an anion (either sulfate or chloride) and also provide anions that react with ammonium cations to form stable nitrogen rich complexes. The amino acid lysine is another example of a compound that can have an advantageous impact on both animal health and ammonia reduction. If an animal is fed lysine including a counter-anion, when the lysine is metabolized the counter anion may survive the digestion process and combine with ammonium cations in the manure.

As mentioned earlier, a portion of the ammonia found in manure comes from the breakdown of amino acids in the manure. The major source of amino acids in animal manure is undigested or only partially digested proteins and peptides originally found in the animal's feed. "Crude protein" is a general term used to describe proteins comprising a wide range of amino acids added to or at least found in animal feeds. In part because animals have the capacity to biosynthesize some amino acids but not others, an animal feed may be deficient in some amino acids but harbor an excess of other amino acids.

Most animals require minimum amounts of specific amino acids in their diets in order to thrive. Amino acids that must be provided to an animal in its diet include amino acids that the animal cannot biosynthesize. These amino acids are referred to as essential amino acids. Similarly, some animals will grow more efficiently if they are provided a diet rich in certain amino acids than if they are fed a diet having sub-optimal amounts of these amino acids. Limiting amino acids are amino acids present in an animal feed at such low levels that they limit the productivity of the animal fed that diet. In part because of the unequal distribution of amino acids in various crude protein sources, a crude protein source may have an excess of some amino acids while being deficient in other amino acids.

The list of essential amino acids and amino acids that are difficult to biosynthesize varies from species to species but often includes, for example, lysine, methionine, threonine, and tryptophan. These are also primary amino acids that often act as limiting factors on the metabolism of a laying hen.

When excess amino acids are excreted, they break down and contribute to the amount of volatile ammonia in the excrement. Given that proteins in manure contribute to the amount of ammonia produced by the manure, reducing the levels of crude protein fed to an animal can help to reduce the amount of volatile ammonia in an animal's manure.

It is one aspect of the invention to reduce the level of volatile ammonia in manure by reducing the amount of crude protein in an animal's feed rations. While this approach clearly helps to reduce the amount of ammonia in an animal's manure, care must be taken with this approach as imbalances in amino acid content are magnified when crude protein levels are reduced. In order to simultaneously reduce the level of excess amino acids in an animal's feed while at the same time providing an optimal level of all amino acids, animal feed can be supplemented with specific, otherwise limiting, amino acids. By significantly reducing total crude protein levels and adding back a required amount of one or all of these limiting amino acids, it is possible to reduce the total amount of amino acids excreted by hens without reducing the hen's metabolism. Fewer excreted amino acids result in less nitrogen (and less ammonia) in the manure.

In still another aspect of the invention, volatile ammonia levels in manure are reduced by adding compounds to an animal's feed ration that are converted to cationic compounds which react with ammonium cations to form stable compounds. Compounds that can react with ammonium cations to form stable compounds include but are not limited to sulfate. Sulfate anions readily react with ammonium cations to form ammonium sulfate. Ammonium sulfate is stable at alkaline pH. Accordingly, nitrogen sequestered in the form of ammonium sulfate is not free to form volatile ammonia even as the pH of the manure drifts upwards.

One particularly good source of sulfate ions for the practice of the invention is gypsum (calcium sulfate). Gypsum is inexpensive, and in addition to providing a source of sulfate ions for the control of ammonia levels in manure, it provides the animal with a required element, calcium.

Simply feeding an animal a ration rich in gypsum may not be enough to significantly reduce the amount of volatile ammonia in the animal's manure. Referring now to Table 1 and FIGS. 1 and 3, the amount of ammonia off-gassed from manure produced by an animal fed rations supplemented with gypsum only increased 24 hours after the manure was produced relative to the ammonia off-gassed from manure produced by an animal fed a control ration. Over the period of one week, the levels of ammonia emitted from manures produced by hens fed rations supplemented with gypsum were only 15% lower than the levels of ammonia emitted from manures produced by hens fed control rations.

In another aspect of the invention, an animal is fed a ration comprising compounds that effectively bind ammonium cations. One particularly attractive method is to feed the animal a cation exchanger that substantially retains its affinity for cations even after it has passed through the animal's digestive tract. Materials with a high cation affinity include compounds with a high cation exchange capacity. One class of compounds with high cation exchange capacities that are particularly useful for the practice of the invention is the class of zeolites. Zeolites have a high capacity to bind cations such as ammonium ions, and zeolites generally can pass through the gut of most animals with their affinity for cations substantially unchanged.

Figure 3:
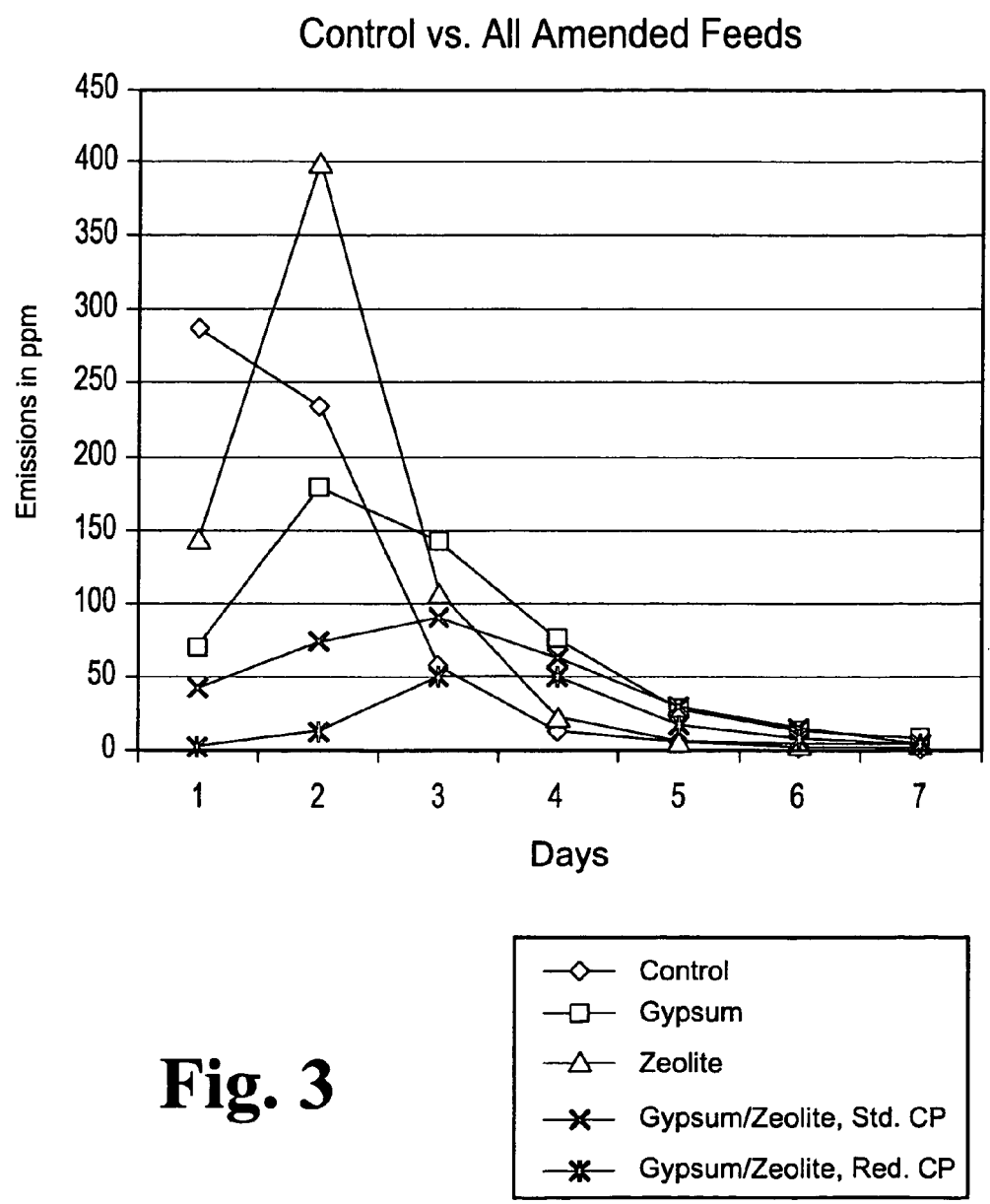
FIG. 3 is a graph of ammonia emissions in parts per million (ppm), measured over a 7-day period, from chicken hens fed a) a control diet of feed containing 18.8% crude protein by weight and 4.2% calcium by weight; b) the control diet supplemented with gypsum, which was added in an amount sufficient that the gypsum was the source of 45% of the dietary calcium; c) the control diet supplemented with zeolite, when zeolite comprised 2% by weight of the feed; d) the control diet supplemented with gypsum and zeolite when gypsum was the source of 45% of the dietary calcium and zeolite comprised about 2% by weight of the feed; and e) a reduced (relative to the control diet) crude protein diet wherein the calcium content remained at 4.2% by weight, and crude protein comprised 15.0% by weight of the feed. Additional lysine was added to the ration used in 5 e such that lysine comprised 0.98% by weight of the feed. The feed used in FIG. 5 e also included gypsum and zeolite. Gypsum was the source of about 45% of the dietary calcium in the feed, and zeolite comprised about 2% by weight of the feed.

Referring still to Table 1 and FIGS. 1 and 3, merely feeding an animal rations supplemented with zeolite alone does not significantly reduce the level of ammonia off-gassed from manure produced by the animal. One plausible explanation for these data, presented by way of illustration and not limitation, is that the manure produced by hens fed a diet supplemented with zeolite, but not an acidogenic compound, is alkaline. Highly alkaline conditions favor the formation of ammonia, and ammonia does not effectively bind to zeolite.

It is one aspect of the invention to feed animals a ration comprising both one or more cation exchangers such as zeolite and one or more acidogenic compounds. Acidogenic compounds in the animal's manure will reduce the pH of the manure, thereby promoting the protonation of ammonia to form ammonium, which can then bind to zeolite.

Figure 2:
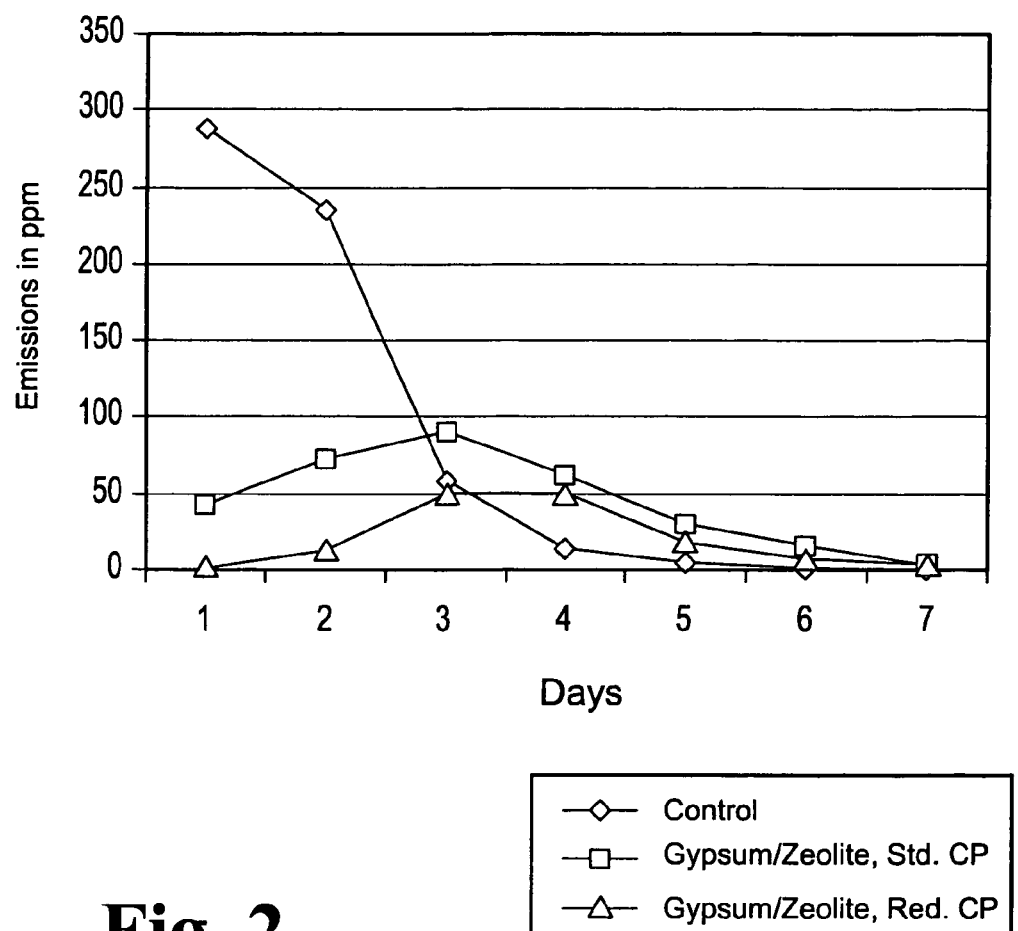
FIG. 2 is a graph of ammonia emissions from chicken hen manure measured over a 7-day period. The ammonia emissions are reported in units of parts per million (ppm) ammonia. Briefly, manure samples were collected from hens fed one of the following three feed rations: a.) a control ration including 18.8% crude protein by weight and 4.2% calcium by weight; b.) a feed ration similar to the control feed ration supplemented with about 2% by weight zeolite and gypsum, the amount of gypsum added to the ration was sufficient to provide about 45% of the calcium in the ration; and c.) a feed ration similar to the control ration but having only 15.0% by weight crude protein. This ration was supplemented with lysine such that lysine comprised 0.98% by weight of the feed, the ration also included, 2% by weight zeolite, and gypsum. The amount of gypsum added to trial c was sufficient to provide about 45% of the calcium in the feed.

Referring again to Table 1 and FIGS. 2 and 3, hens fed rations comprising both gypsum and zeolite produced manure that off-gassed substantially less ammonia than manure produced by hens fed rations formulated with neither zeolite or gypsum (or with only one of these compounds). Again by way of explanation and not limitation, it is likely that the sulfate in the manure (from gypsum) reduced the pH of the manure and reacted with some of the ammonia to form ammonium sulfate. At the same time, ammonium cations that did not react with the sulfate anions bound to zeolite in the manure. Ammonium cations bound to zeolite are not readily deprotonated even at alkaline pH, and therefore the overall level of ammonia off-gassed decreased over the 1-week period for which data was collected.

In yet another aspect of the invention, the level of volatile ammonia in animal manure is reduced by feeding an animal a ration comprising reduced levels of crude protein and supplements of zeolite and calcium sulfate (gypsum). Referring still to Table 1 and FIGS. 2 and 3, the amount of volatile ammonia from hen manure was further reduced by reducing the amount of crude protein in the animals' rations. Manures with the lowest level of ammonia were those produced by hens fed reduced crude protein diets wherein the feed was supplemented with both zeolite and gypsum.

Poultry excrement is rich in uric acid. Accordingly, poultry manure is essentially a semi-solid. In other animals, for example, hogs, the animal's excrement is comprised of a semi-solid (feces) and a liquid (urine). If an animal's excrement contains urine in a liquid form, then it can be physically separated from the animal's feces.

Sequestering of liquid urine and semi-solid feces is most readily accomplished when the animals are housed in a controlled environment. Because a large percentage of the urea is found in liquid urine, it is advantageous to collect the urine separate from the remainder of the animal's excreta. When practical, separating urine from feces helps to control the release of ammonia from the manure. However, even when manure and feces are separated, degradation of nitrogen rich compounds in the feces may still result in the release of ammonia.

Yet another aspect of the present invention provides a method for lowering the amount of ammonia off-gassed from animal excrement separated into liquid and semi-solid components. Physically separating feces and urine decreases the rate at which ammonia is formed and off-gassed from the feces. Absent the hydroxyl ions formed primarily by the urea-/urease-catalyzed reaction in the urine, the pH of feces does not rise as quickly as when urine is present. The tendency toward a lower pH helps to reduce the rate of ammonia production. When compounds that reduce the pH of the animal's feces are present, the rate of ammonia production is further reduced. Ammonia off-gassing from feces separated from liquid urine is reduced still further when zeolite or some other ammonium binding cation is present in the manure.

When it is impractical to separate an animal's feces and urine, as is the case with poultry, the pH of the mixed manure can be reduced by the addition of acidogenic compounds to the animal's diet. One or more acidogenic compounds in the animal's feed ration is capable of lowering the overall pH of the animal's manure, thereby increasing the concentration of ammonium relative to ammonia in the manure. A feed comprising both an acidogenic compound and a cation exchanger, such as zeolite, further reduces the level of ammonia off-gassed as zeolite forms stable complexes with ammonium cations. However, the pH of most manures rises over time, thereby favoring the production of ammonia. Because the pH of manure tends to increase over time, one aspect of the invention is to add one or more acidogenic compounds and zeolite to the animal's feed ration. Ammonium cations formed under low pH conditions are then trapped by the zeolite before they can deprotonate to ammonia as the pH increases.

Urease is most active in the pH range between 6.5 SU and 7.0 SU. Those of ordinary skill will recognize that ammonium ions form when ammonia is protonated and that a low pH strongly favors this reaction. Therefore, the presence of acidogenic compounds in an animal's feed that helps to reduce the pH of the animal's manure will reduce the amount of ammonia off-gassed from the animal's manure.

If zeolite is present in manure at the same time ammonium cations are formed, then the zeolite will bind the cations. However, once the pH becomes alkaline, the equilibrium between ammonium and ammonia will favor the formation of ammonia, which does not bind to zeolite. The result of experiments summarized in Table 1 and FIGS. 1 and 3 demonstrate that this is the case. There is a marked increase in the rates of ammonia emitted from manures formed by animals fed rations comprising zeolites but no acidogenic compounds over the 24-48 hour period right after excretion.

One embodiment includes feeding fowl a feed comprising calcium, protein, and phosphorus levels consistent with the nutritional requirements of birds of that species, variety, and age. In this embodiment, nutritionally available phosphorus levels are supplemented by addition of phytase to the feed. Phytase converts phytic acid, a source of phosphate that most birds cannot metabolize, into a bio-available form of phosphate. By adding phytase, the total amount of phosphate added to the feed can be reduced.

If required, inorganic phosphate in the form of dicalcium phosphate is added to the feed. For example, a feed ration may contain about 0.1% available phosphorus. Additional phosphorus may be present in the feed as phytic acid. The enzyme phytase can be added to the feed to increase the amount of bioavailable phosphorus by an additional 0.1%. The added dicalcium phosphate supplies the balance of the phosphorus that the animals require without significantly contributing to the amount of phosphate in the animal's manure.

The total amount of crude protein in the feed can be reduced compared to the level of crude protein found in industry standard rations. For example, initial reductions in crude protein levels preferably approached 4% in the amended diet compared to a standard diet. Lowering total crude protein levels will result in lower levels of protein in the manure and therefore microorganisms and insects metabolize less ammonia into volatile ammonia released into the atmosphere from protein in the manure. The actual amount of purified amino acids that needs to be added back depends upon the level of the limiting amino acids in the feed and the nutritional requirements of the animals.

As the birds age, they require less protein and phosphorus. Accordingly, the level of crude protein and phosphorus in the bird's diets can be reduced as the animals age. Those of ordinary skill in the art will recognize that this is a standard practice for laying hens. Reduced crude protein levels in feed may follow this trend as the bird ages as well, but dietary levels of limiting amino acids must be met if bird health and performance are not to suffer. In the event that proteins levels are reduced to the point when an amino acid becomes limiting, purified forms of the limiting amino acids are added back to crude protein-reduced feeds to insure bird health and performance.

In one embodiment, gypsum is substituted for limestone as a source of at least some of the calcium the animals require. Gypsum contains a lower weight percentage of calcium than limestone, and this factor is taken into account when supplementing feed with gypsum to insure that the animals receive an adequate amount of calcium. In one embodiment, the weight percentage of calcium derived from gypsum is approximately 23%, and the weight percentage of calcium derived from limestone is approximately 38%. In another embodiment, gypsum accounts for 25% to 35% of the amount of supplemental calcium added to the animal's feed.

In one embodiment, zeolite is added to the feed such that it comprises between about 1.25% to about 2% by weight of the ration. The zeolite used to supplement the feed can be a naturally occurring clinoptilolite that contains significant levels of exchangeable calcium and magnesium.

The ratios of gypsum substitution and zeolite addition may be varied, as may the particle sizes of the gypsum and zeolite materials chosen. It is well established that smaller particles dissolve in the gut faster than larger particles. Laying hens require a slow release of a sufficient level of dietary calcium in order to make effective use of it during eggshell production. For this reason, pulverized limestone (small particle size) is considered a less effective dietary supplement than larger limestone particles.

The gypsum and zeolite materials chosen for addition to the rations may be varied from the more preferred materials taught herein and still achieve the unexpected results of the invention. By way of example, and not of limitation, gypsum comes in hydrous and anhydrous forms and may be obtained in a variety of size gradations.

It should also be noted that crude protein levels in the instant feed ration may be varied. Feed so amended may require the addition of various purified amino acids so that the ration will include the minimum amount of any specific amino acids necessary for animal health.

Zeolites come in many different types and size gradations, and those chosen by the skilled practitioner for use in the present invention may be naturally occurring or manmade and may be of any usable size. Zeolites used in the invention may be pre-loaded with certain usable cations or may have beneficial cations already present. Use of any of a variety of acidogenic substances and types of zeolite or other high cation exchange capacity materials may also be of utility to the skilled artisan in achieving the unexpected results of the present invention. One especially useful form of zeolite is zeolite loaded with dissociateable phosphate binding metal. Such phosphate binding metals include, but are not limited to, magnesium and calcium.

Additionally, other animals besides hens may be fed suitable rations according to the teachings of the present invention in order to achieve the goals of the invention. Those of skill in the art will recognize the dietary requirements of the other animal(s) chosen, and modifying the preferred embodiments of the present invention to suit such other animal(s) needs will not require undue experimentation.

All animals require a bioavailable source of phosphorus; therefore, all nutritionally complete animal feeds must include a source of bioavailable phosphorus. However, if animals are fed a diet too rich in phosphate, then they will excrete the excess phosphorus or, more accurately, compounds comprising phosphorus such as phosphates. Manure from animals fed excess phosphorus may be a rich source of water-soluble phosphate. The disposal of animal manure with a high soluble phosphate content can be problematic, as soluble phosphates can contaminate both surface waters and aquifers.

Given the potential for environmental damage presented by manure high in soluble phosphate, reducing the phosphorus content of manure may be of great environmental benefit.

One way to reduce soluble phosphates in manure is to add phosphorus-reactive metals such as iron, calcium, magnesium, and aluminum, to the subject animal's manure. One problem with this approach is that overfeeding of some of these metals may be detrimental to animal health. For example, ill effects of overfeeding iron, magnesium, and aluminum are known.

One aspect of the invention provides a method of reducing soluble phosphate levels in animal manure by feeding phosphorus-reactive metals without compromising animal health. Animals are fed a ration comprising zeolite that binds high levels of phosphorus-reactive metals. The animal does not take up phosphorus-reactive metals bound to zeolite until they are released in exchange for another zeolite-binding cation. Feeding animals a form of zeolite with a high natural level of phosphorus-reactive metals (or is pre-loaded with such metals) has an unexpectedly beneficial impact on the level of soluble phosphate in the animal's manure. Zeolite binding phosphorus-reactive metals, that can dissociate from the zeolite especially in exchange for other cations, are an effective means of delivering phosphate reactive metals to the manure. Other cations in the manure, for example, ammonium cations, may displace the dissociatable phosphate reactive metal, which then reacts with excess phosphorus to form an insoluble complex.

Data summarized in Table 3 illustrate some of the beneficial effects of feeding animals rations comprising zeolite-binding phosphorus-reactive metals and gypsum. An animal fed a ration comprising zeolite binding metals and gypsum produce manure with a lower level of soluble phosphate than manures produced by an animal fed industry standard (control) rations.

In one aspect, the invention provides animal rations capable of reducing the total amount of phosphates in an animal's manure. Many rations, especially rations rich in grains, contain phytic acid. This compound is a major phosphorus storage source in plants. Monogastric animals in particular have difficulty digesting phytic acid. Adding phytase to a feed ration that includes phytic acid can increase the amount of bioavailable phosphorus in the ration. Phytase is an enzyme that catalyzes the hydrolysis of phytic acid to inositol and phosphoric acid. As illustrated by the results summarized in Table 3, feeding a monogastric animal a feed comprising reduced levels of phosphate results in the production of manure with lower levels of soluble phosphates.

Phosphoric acid is more readily absorbed by monogastric animals than is phytic acid. Therefore, adding phytase to animal feeds comprising phytic acid elevates the level of bioavailable phosphorus in the feed. For a more complete discussion of phytase, the reader is directed to U.S. Pat. No. 6,548,282, which patent is incorporated by reference herein in its entirety.

EXPERIMENT

Experiment 1

In order to determine the efficacy of adding a high cation exchange capacity material pre-loaded with phosphate-reactive metals and acidogenic substances to animal feed rations, a test flock of white leghorn hens (HyLine W-36) was prepared. The test flock was subdivided into several units so that the effects of the various feed strategies could be monitored and compared. One unit acted as a control. This unit was fed a conventional industry standard diet, which initially comprised 18.8% by weight of crude protein, 4.2% by weight of calcium, and 0.5% by weight of bioavailable phosphorus. The conventional industry standard diet fed to the hens of this and the following examples as a control ration was substantially similar to the diet rations described in "Hy-Line Variety Commercial Management Guide 2003-2004" published by Hy-Line International, West Des Moines, Iowa, U.S.A. and available online at www.hyline.com.

A second unit was fed a ration of similar characteristics, which differed from the control unit in that gypsum was partially substituted for limestone such that 45% of the calcium supplement for the diet was derived from gypsum. A third unit was fed a ration substantially similar to the control ration, differing from the control ration in that it comprised a naturally occurring low-sodium clinoptilolite zeolite added such that it comprised 2% by weight of the feed ration. The form of zeolite used in ration 3 comprised a significant level of exchangeable phosphate-reactive calcium and magnesium. A fourth unit was fed a diet substantially similar to the control diet, differing in that it comprised zeolite in the amount of 2% by weight, and gypsum was partially substituted for limestone such that 45% of the supplemental calcium was derived from gypsum.

The fifth unit was fed a ration comprising 2% by weight of zeolite and gypsum substituted for limestone such that 45% of the supplemental calcium was derived from gypsum. However, this fifth ration had a significantly reduced crude protein level, being reduced from 18.8% by weight as in the control diet, to 15.0% by weight. This diet also contained 0.5% bioavailable phosphorus. The ration of the fifth unit was further amended with a purified form of the amino acid lysine such that lysine comprised 0.98% by weight of the feed to avoid detrimental effects from not providing enough limiting amino acids to thrive. All rations in the study were equivalent in terms of kilo-calories (kcals) per pound.

All rations comprising limestone added as a source of calcium included granular limestone having particle sizes ranging from just under ¼ inch in diameter down to a coarse dust. It is well settled that the speed of calcium uptake in hens is influenced by granulation size of the source of calcium. For laying hens, a slow, continual uptake is preferable; hence the calcium source is moderately coarse. Smaller granules would digest too quickly, and the excess calcium liberated would be excreted, rather than used by the bird for vital functions.

During the experiment, the number and quality of eggs produced by hens fed various rations were compared. Hens fed the amended rations showed some initial improvement in production over hens fed control rations. Eggs produced by hens fed the gypsum-substituted rations (hens in the second unit) weighed slightly less than eggs produced by hens fed the control ration.

In the second phase of the experiment, the approximate upper limit of gypsum replacement for the second, fourth, and fifth units of hens was measured. The amount of gypsum in the ration was increased and the amount of limestone in the ration was decreased such that 66% of the supplemental calcium in the ration was derived from gypsum. Hens fed this ratio produced slightly fewer eggs, and the eggs they did produce had a slight (but still acceptable) decrease in eggshell quality. In the next experiment, gypsum was added to the ration such that gypsum contributed 75% of the supplemental calcium in the ration. Hens fed this ration produced fewer eggs than hens fed the control ration, and the eggs they did produce had unacceptable shell quality.

In still another variation of the experiment, the amount of calcium derived from gypsum was reduced to 45% of the total amount of calcium fed to the animals. When gypsum was supplemented at this level, both egg shell quality and egg production figures returned to acceptable levels. Cumulative data collected over a 1 year period, including data from the period of very high gypsum supplementation, showed an approximate 4% increase in egg production from hens fed the amended rations relative to hens fed control feed rations. Eggs produced by hens fed the gypsum/zeolite-amended rations were also, on average, heavier than eggs produced by hens fed the control ration. Hen mortality was similar in all groups.

The production increase and egg weight increase noted may be due to better living conditions for the test hens compared to hens in a normal production environment. The increases may also be attributable to a feed formulation that enables the hens to make more efficient use of the feed, or the increases may be caused by a combination of factors including the aforementioned reasons.

One conclusion of the aforementioned study is that white leghorn hens (HyLine W-36) should not be fed a diet in which greater than about 66% of the calcium is derived from gypsum. Still another conclusion is that such hens should be fed a diet that derives 50% or less of its calcium from gypsum.

Experiment 2

Manure produced by hens fed a ration that included the optimal amount of gypsum substituted for limestone was assayed less than 1 hour post-excretion. This manure was immediately transported to a laboratory, where the manure from each unit was homogenized and a 25-gram aliquot placed in a flask. The flask was supplied with air via an air pump. The air passed across the manure and collected the ammonia emitted. The ammonia-laden air was then bubbled through an acid solution to capture the ammonia. Every 24 hours, for a period of 7 days, the acid solution was changed out for fresh solution, and the samples were assayed to determine their levels of ammonia. Data resulting from the initial lab analyses are illustrated in Table 1.

FIG. 1 illustrates the effect of supplementing chicken feed with zeolite in the absence of added acidogenic substances. Chickens fed rations supplemented with zeolite alone did not produce manure that emitted less ammonia than manure from birds fed the control ration. A comparison with ammonia emission levels collected in Table 1 indicates a 13% increase in ammonia emission levels from manure produced by chickens fed feed comprising zeolite compared with the ammonia emission levels from manure produced by chickens fed the control ration.

Also illustrated in FIG. 1 is the effect of substituting gypsum for limestone on ammonia emissions. By week two of the study, the amount of ammonia emitted from manure produced by hens fed gypsum was lower than the amount of ammonia emitted from manure produced by hens fed the control diet. However, the buffered nature of the manure appears to take over in the 24-48 hour period, and ammonia emission rates determined for manure collected even from hens fed a gypsum-rich diet increased significantly. Still, comparison calculations collected in Table 1 illustrate that over a 1-week period there was a 15% reduction in overall ammonia emissions from manure from hens fed the experimental diet.

As FIG. 2 illustrates, when gypsum-substituted diets were augmented with zeolite, there was a significant and unexpected decrease in ammonia emissions from manure collected from hens fed the amended feed compared to manure collected from hens fed the control diet. Comparison calculations in Table 1 indicate that over a 1-week period, relative to the manure from hens fed the control ration, there was a 47% reduction in the amount of ammonia emitted from manure produced by hens fed the gypsum plus zeolite diet, as compared to a 15% reduction observed in manure collected from hens fed the gypsum-supplemented diet.

Referring again to Table 1, comparing the control diet with the gypsum/zeolite diet containing standard crude protein levels shows an 85% reduction in ammonia emissions for the 0-24 hour period. The data in Table 1 for the 24-48 hour period comparing the same diets shows a 69% reduction in ammonia emissions.

Manure from hens fed the gypsum/zeolite-augmented ration showed a 38% lower level of ammonia emissions in the first 24-hour period and 59% lower ammonia emissions in the 24-48 hour period than manure collected from hens fed a gypsum-augmented diet. The tendency of poultry manure to increase in pH appears to contribute to a general increase in ammonia emissions starting in the 24-48 hour period. However, this increase is substantially lower in manure from hens fed a ration comprising gypsum and zeolite than in manure from hens fed a ration comprising gypsum alone. Clearly, feeds comprising zeolite and an acidogenic substance acting in concert provide a significant advance in the art, as this combination reduces manure ammonia emissions to an unexpected and significant extent when compared to industry standard diets or diets augmented with just a cation exchanger or just an acidogenic compound.

Additionally, FIG. 2 illustrates the unexpected and beneficial effects on manure ammonia emissions when crude protein levels in feed are reduced in combination with the addition of gypsum/zeolite. Comparison calculations in Table 1 indicate a 77% reduction in ammonia emissions from manure produced by chickens fed this reduced protein combination diet over the 1-week study period as compared to emissions from manure produced by chickens fed the control diet.

A comparison of Table 1 data for control diet emissions to low crude protein levels/gypsum/zeolite augmented diet emissions indicates a >99% reduction in ammonia emissions in the 0-24 hour period and a 94% reduction in the 24-48 hour period. When those same figures are compared to the standard crude protein levels/gypsum/zeolite augmented diet, the low crude protein level/gypsum/zeolite augmented diet has 98% lower ammonia emissions in the first 24-hour period and 82% lower ammonia emissions in the 24-48 hour period.

As illustrated in FIG. 3, hens fed a ration comprising an appropriate level of one or more acidogenic compounds and one or more indigestible cation exchangers produced manure that off-gassed less ammonia than manure produced by animals fed the control rations. Hens fed rations comprising zeolite, an acidogenic compound, and lower levels of unabsorbed crude protein produced manure with the lowest level of ammonia emissions.

Experiment 3

Older manure is continually being covered over by fresh as a manure pile accretes. Because ammonia emission occurs from the surface of the manure, accretion may act to suppress ammonia emissions. If this is true, then reducing the amount of ammonia off-gassed from fresh manure even transiently may help to reduce the level of ammonia in a whole hen house.

In order to test this hypothesis, an entire layer house was fed a ration comprising 1.25% zeolite with 25% of the supplemental calcium derived from gypsum. A second layer house used as a control was fed a control ration with no zeolite and all of its supplemental calcium derived from limestone. Crude protein levels in the two rations were nearly identical: 15.3% and 14.8% of total ration weight, respectively.

Because birds in the gypsum/zeolite-amended feed house could likely not tolerate an immediate shift from the standard rations to the amended rations, birds fed the amended ration were weaned from their standard diets to the amended rations over a period of about 6 weeks. Testing for aerosol ammonia at the outlets for house air circulation fans was begun as the diet approached the final levels. Readings were taken at 10 exhaust fan outlets in each house, and the average values of those readings were recorded. Outside temperatures were also recorded to determine if ammonia emission rates correlated with temperature. The experiment was carried out during cold weather when house ventilation is kept at a minimum to conserve heat. During the cold-weather phase of the experiment, pit fans, which are fans placed in the manure collection pit to circulate air to aid in drying manure, were not in operation. Under these conditions, the level of ammonia measured at the exhaust fans fairly represents the average ammonia level in the house.

The data from this phase of the test is summarized in Table 6. As the birds acclimatized to the amended diet, the level of ammonia measured in the house decreased, with an average reduction of 68% over the term of this phase of the study. Near the end of the study, the level of ammonia in the atmosphere of the house correlated well with the level of ammonia emissions measured from manure samples collected from hens fed similar rations monitored over a 1-week period. Compare, for example, the data in Table 6 with the data in Table 5 and FIG. 4.

As the weather warmed, the pit fans were activated, and ventilation rates increased. Again, ammonia emission readings were obtained at the same 10 fans used as data points previously. Special attention was paid to insure that the same numbers of ventilation fans were in operation in both houses during periods of time when data was being collected. Airflow is a significant factor with regard to ammonia emissions. To a point, increases in airflow cause increases in ammonia emissions measured at the vent fans. As illustrated by the data in Table 7, an increase in ammonia emissions was noted in both houses as a result of the pit fans being placed in operation. However, the levels of aerosol ammonia in houses in which the hens were fed a gypsum/zeolite amended ration were significantly lower than the levels measured in the houses with hens fed the control diet. There was, on average, a 43% reduction in the amount of aerosol ammonia in the houses fed the amended diet over the houses fed the control diet over the term of this phase of the study.

No negative effects on egg production, shell strength, or bird health were noted in this whole-house study. In fact, quite the opposite was noted. Egg production, shell strength, and bird health were unexpectedly improved in birds fed the amended rations over birds fed the industry standard ration.

Experiment 4

At least some of the ammonia associated with animal manure is derived from the chemical and microbial degradation of amino acids present in the manure. Reducing the level of crude protein in an animal's rations may help to reduce the amount of ammonia produced in the animal's manure by reducing the major source of undigested amino acids in manure: undigested or only partially digested proteins or other polypeptides.

Figure 4:
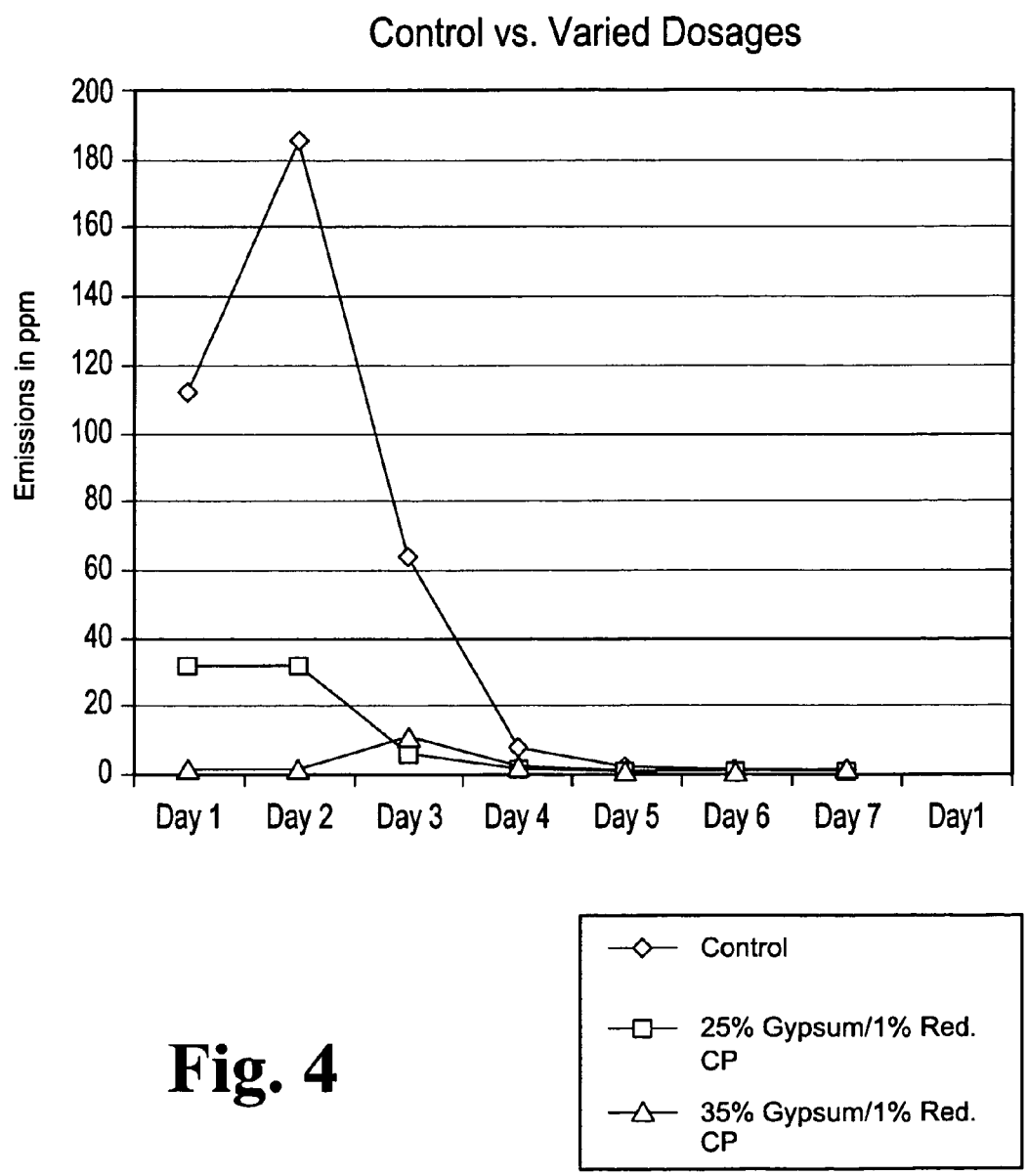
FIG. 4 is a graph of ammonia emissions in parts per million (ppm), measured over a 7-day period, from chicken hens fed a) a control diet of feed when crude protein comprised 14.8% by weight of the feed and calcium comprised 4.2% by weight of the feed; b) a diet when crude protein comprised 15.3% by weight of the feed, calcium comprised 4.2% by weight of the feed, gypsum was the source of 25% of the dietary calcium, and zeolite comprised 1.25% by weight of the feed; c) a diet comprising a reduced (relative to the control diet) amount of crude protein when crude protein comprised 14.3% by weight of the feed, with additional lysine added so that lysine comprised 0.84% by weight of the feed, calcium comprised 4.2% by weight of the feed, gypsum was the source of 35% of the dietary calcium, and zeolite comprised 1.25% by weight of the feed.

Referring now to Table 5 and FIG. 4, an experiment was carried out to determine if reducing crude protein levels and increasing the level of gypsum substituted for limestone in the amended feeds would decrease the level of ammonia emitted by birds fed the amended ration. Accordingly, one group of hens was fed a control ration. A second group of hens was fed a ration comprising gypsum substituted for some of the supplemental calcium in the ration and lower levels of crude protein than the control ration. The levels of ammonia emitted by manure excreted by these birds were compared. The control values were measured from manure collected from hens fed the same feed ration as the hens in the control group of the whole house study. The 25% gypsum curve shows the effect of the amended diet fed in the whole house study. The 35% gypsum curve illustrates the effect of reducing crude protein from 15.3% by weight of the ration to 14.3% by weight as well as increasing the gypsum-based calcium replacement levels to 35%. All amended feeds comprised 1.25% zeolite by weight. These data were generated using the same analytical methods as previously described.

Referring still to Table 5 and FIG. 4, whole-house ammonia emissions in houses where hens were fed gypsum/zeolite amended rations were approximately 80% less than in the control house. Reducing crude protein by 1% from 15.3% by weight to 14.3% by weight, and at the same time increasing gypsum-based calcium supplementation rates to 35% instead of 25%, garners an approximately 95% reduction in ammonia emissions (relative to the control house). That level of reduction was unexpectedly high. To confirm this, the test was repeated using fresh manure. The reduction in the rate of ammonia production and in the total amount of ammonia emitted was virtually identical between the two experiments.

Moisture levels are known to be a factor affecting ammonia emissions. Therefore, the percentage of solids in each manure sample was also determined. Solids contents in manures generated from consumption of amended and control rations were very similar, ranging from about 20% to 24% for freshly excreted manure.

Experiment 5

High levels of total phosphorus and, especially, high levels of soluble phosphates in manure pose significant threats to the environment, particularly when the manure finds its way into the watershed. The following survey was conducted to determine if adding phosphorus-reactive metals bound to zeolite to an animal's feed rations could reduce the amount of soluble phosphate in the animal's manure.

Referring now to Tables 2, 3, and 4, manure produced by hens fed rations comprising zeolite had less soluble phosphorus and less total phosphate than manure generated by hens fed standard rations, even when the total amounts of bioavailable phosphorus in each ration were the same. The observed drop in the total amount of phosphate in manure produced by hens fed rations comprising 2% by weight of zeolite are illustrated in Table 2. The drop in total phosphate levels observed was unexpected. This reduction in total excreted phosphorus may be due to zeolites promoting more efficient uptake and utilization of bioavailable phosphorus.

Since soluble phosphorus is environmentally problematic, the ratio between soluble and total phosphorus in manure is of interest. Referring now to data in Table 3, test rations were supplemented with phytase, an enzyme that tends to elevate the amount of bioavailable phosphorus in grain-rich animal feeds. Additional manure samples were collected, and both total and soluble phosphorus amounts were determined analytically. These data support the conclusion that feeding zeolites comprising exchangeable phosphate-reactive cations appears to reduce significantly the solubility of phosphorus in manure as well as the total amount of phosphorus excreted.

The zeolite used in this experiment contained exchangeable calcium and magnesium cations. The reduction in the amount of soluble phosphate may be due to the formation of insoluble metal phosphate compounds.

In another aspect of the invention, synthetic zeolites can be doped with calcium and magnesium before the zeolite is added to animal feeds. Zeolite dosed with a metal such as calcium and/or magnesium will help to reduce the amount of soluble phosphate in manure produced by animals fed a diet comprising the zeolite.

Tests were conducted on full size layer houses to determine if the amended rations of the present invention lowered the soluble phosphate levels in manure produced under production conditions. Hens in one house were fed a control ration while hens in a second house with conditions identical to the first house were fed the amended rations used for the large-scale study. Samples of manures of similar age were removed from the manure collection areas of the two layer houses. Samples were analyzed for total Kjeldahl nitrogen, ammonia, and total/soluble phosphorus. All results were reported on a dry weight basis, and these data are summarized in Table 4. Manure from birds fed a gypsum/zeolite-amended diet contained 5.58% nitrogen, 0.93% ammonia, 0.97% total phosphorus, and 0.14% soluble phosphorus. Manure from birds fed the control (industry standard) ration contained 4.88% nitrogen, 1.94% ammonia, 1.08% total phosphorus, and 0.30% soluble phosphorus.

Experiment 6

It is another aspect of the invention to produce manure that is better suited for use as a component of fertilizer than is manure produced by animals fed standard rations. Plants require both nitrogen and phosphorus; however, too much of either element can adversely affect plant health. The ratio of nitrogen to phosphate (N:P ratio) of manure produced by hens fed standard rations is oftentimes so low that this manure must be processed before it can be used to produce fertilizer. This processing adds to the expense of fertilizer made from such manure. Manure produced by hens fed the amended feed of the present invention had an unexpectedly more favorable N:P ratio.

In order to determine if the combination of feeding hens a cation exchanger, an acidogenic compound, and one or more phosphate-reactive metals would have an impact on the manure's N:P ratio, hens were fed the various rations. The nitrogen/phosphorus (N:P) ratio of manure from birds fed the amended ration is 5.8:1, whereas manure from control birds exhibited an N:P ratio of 4.5:1. The N:P ratio of manure produced using the rations of the present invention is better suited for use in plant fertilizer than is manure produced by animals fed the control ration. It is also worth noting that the reduction in ammonia levels in manure from birds fed amended feed is roughly consistent with the previously stated reductions in aerosol ammonia levels observed in the large-scale study reported in Experiment 4.

Manure from hens fed the amended ration has a lower level of soluble phosphate than manure from hens fed the control ration. Given that soluble phosphate in surface water can be a significant environmental problem, manure produced by animals fed rations comprising gypsum/zeolite amended feed makes for more environmentally friendly manure. When the manure generated from consumption of the amended feed gets applied to a field, there is less phosphorus that can dissolve in rain and run off to the local streams and ponds.

Experiment 7

Still another aspect of the invention is a method of reducing the number of flies associated with manure produced by animals fed the inventive rations. This unexpected benefit was first observed in the whole-house trial. Referring now to Table 8 and FIG. 5, fly card data were collected over a 1-week period. Data were collected from whole houses in which hens were fed either the control (conventional industry standard diet) or one of the amended diets. One amended diet included, a zeolite and 25% gypsum, and the other amended diet included zeolite, 35% gypsum, and reduced crude protein levels (crude protein levels were reduced by 1%). These feeding experiments were carried out in duplicate.

Figure 5:
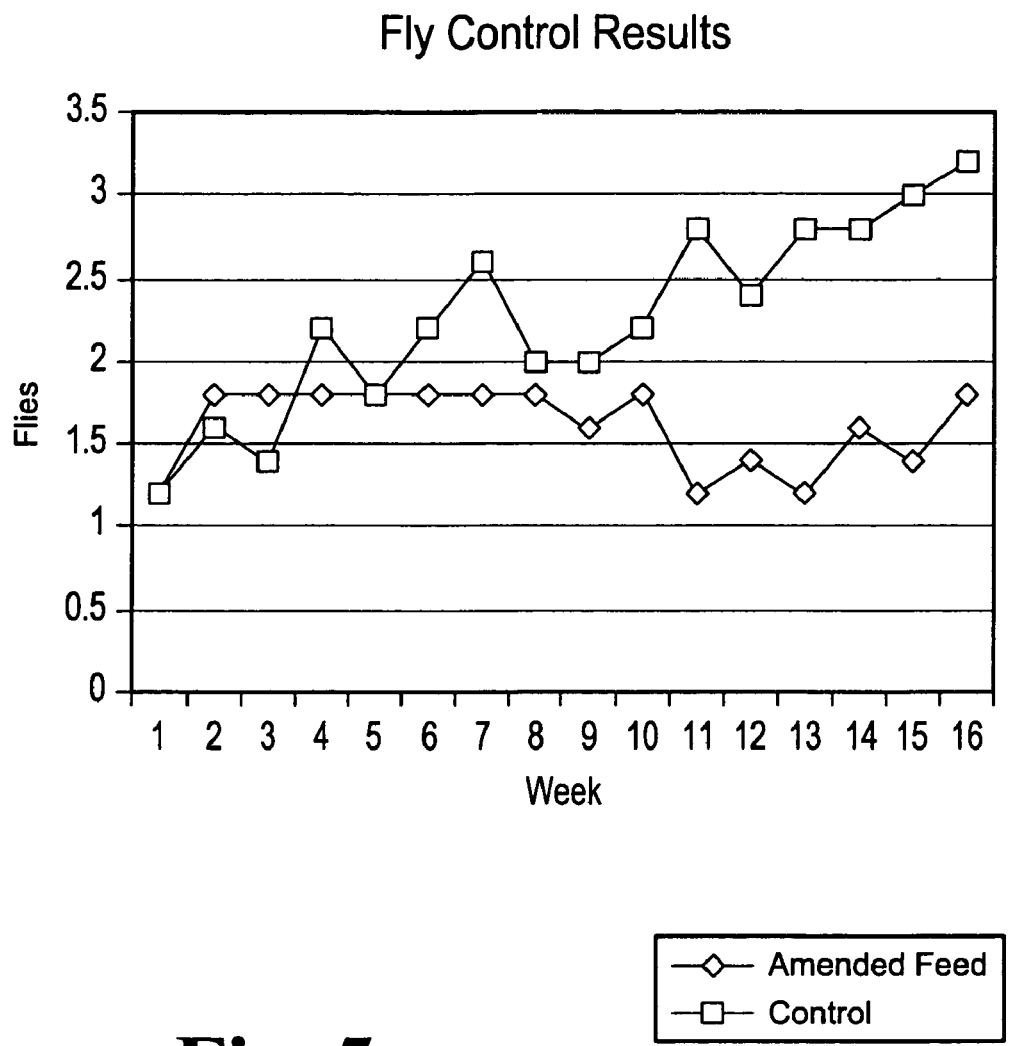
FIG. 5 is a graph of fly card data collected in hen houses plotted as a function of weeks on which egg laying hens were fed either standard or amended rations. These data illustrate a significant reduction in the number of flies associated with hens fed amended rations comprising zeolite and an acidogenic compound versus hens fed the industry standard (control) rations. The reduction in flies was first observed during week 4 of the study and continued through the end of the study (week sixteen).

As illustrated by the data in Table 8 and FIG. 5, there are fewer flies in houses in which hens were fed the gypsum/zeolite amended ration than in houses in which hens were fed the control ration. A similar reduction was also observed at the manure storage pit level and at the bird cage level. Additionally, noticeably fewer maggots and flies were present in the house in which the amended feeds were utilized. This effect may be based on acidification of the manure, as many types of fly larvae are not tolerant of a growth medium with a pH below 7 SU.

TABLE 1

Ammonia Emission Control Feed Amendments

| | Control | Zeolite | Gypsum | Gypsum/Zeolite Std CP | Gypsum/Zeolite Reduced CP |
|---|---|---|---|---|---|
| Day 1 | 288 | 144 | 69.5 | 42.8 | 0.99 |
| Day 2 | 235 | 398 | 178 | 73 | 13.1 |
| Day 3 | 57.9 | 107 | 142 | 90.6 | 50 |
| Day 4 | 13.8 | 22.4 | 76.3 | 62 | 50 |
| Day 5 | 4.9 | 6 | 26.9 | 30.4 | 17 |
| Day 6 | 2.12 | 3.95 | 13.2 | 15.4 | 6.68 |
| Day 7 | 1.67 | 2.81 | 6.59 | 4.4 | 2.8 |
| Totals | 603.39 | 684.16 | 512.49 | 318.6 | 140.57 |
| % Reduction | 0.00 | −13.39 | 15.06 | 47.20 | 76.70 |

TABLE 2

Effects of zeolite on total phosphorus excreted, shown in units of lbs./ton of manure

| | Supplemented with zeolite | Control Diet | % Reduction in Phosphate |
|---|---|---|---|
| Sample 1 | 29.54 | 39.28 | 24.80 |
| Sample 2 | 32.66 | 40.64 | 19.64 |
| Sample 3 | 28.9 | 29.68 | 2.63 |
| Sample 4 | 17.42 | 24.4 | 28.61 |
| Sample 5 | 26.58 | 33.84 | 21.45 |
| Sample 6 | 13 | 19.58 | 33.61 |
| Sample 7 | 12.46 | 19.88 | 37.32 |
| Sample 8 | 10.5 | 20.06 | 47.66 |

TABLE 3

Effects of Zeolite on Soluble/Total Phosphorus Ratio.

| | Zeolite (ppm) | Control (ppm) | % Reduction in Soluble Phosphate |
|---|---|---|---|
| Soluble Phosphorus | 207 | 2760 | 92.50 |
| Total Phosphorus | 1380 | 3900 | 64.62 |
| % Soluble Phosphorus | 15.00 | 70.77 | |

TABLE 4

Manure Analysis, results reported on a dry weight basis.

|  | Supplemented feed (ppm) | Unsupplemented feed (ppm) |
|---|---|---|
| Total Kjeldahl Nitrogen | 55700 | 48800 |
| Ammonia | 9290 | 19400 |
| Total Phosphorus | 9670 | 10800 |
| Soluble Phosphorus | 1360 | 3000 |

TABLE 5

Results of dose response/optimization study.

|  | Control | 25% Gypsum | 35% Gypsum CP reduced by 1% Trial 1. | 35% Gypsum CP reduced by 1% Trial 2. |
|---|---|---|---|---|
| Day 1 | 112 | 32.2 | 1.69 | 4.96 |
| Day 2 | 185 | 31.6 | 1.47 | 0.79 |
| Day 3 | 64.1 | 6.6 | 10.8 | 1.89 |
| Day 4 | 7.96 | 1.55 | 2.06 | 2.36 |
| Day 5 | 2.2 | 0.76 | 1.15 | 1.79 |
| Day 6 | 1.56 | 1.15 | 1.14 | 1.87 |
| Day 7 | 1.32 | 1.12 | 1.29 | 1.80 |
| Total | 374.14 | 74.98 | 19.6 | 15.46 |
| % Reduction | 0.00 | 79.96 | 94.76 | 95.87 |

TABLE 6

Averaged Ammonia Emissions at Exhaust Fan Inlets Measured When the Pit Fan Ventilation Fans Were Inactivated.

| Date | Amended Feed | Control | % Reduction | Outside Temperature |
|---|---|---|---|---|
| Day 1 | 18.0 | 41.6 | 56.7 | 38 |
| Day 2 | 17.2 | 45.5 | 62.2 | 23 |
| Day 3 | 15.7 | 40.0 | 60.8 | 28 |
| Day 4 | 15.0 | 43.1 | 65.2 | 36 |
| Day 5 | 14.8 | 35.0 | 57.7 | 20 |
| Day 6 | 14.5 | 36.4 | 60.2 | 16 |
| Day 7 | 18.0 | 39.6 | 54.5 | 12 |
| Day 8 | 16.9 | 37.0 | 54.3 | 2 |
| Day 9 | 11.5 | 42.7 | 73.1 | 24 |
| Day 10 | 12.8 | 45.4 | 71.8 | 34 |
| Day 11 | 12.0 | 48.8 | 75.4 | 34 |
| Day 12 | 12.0 | 53.0 | 77.4 | 37 |
| Day 13 | 8.6 | 48.8 | 82.4 | 46 |
| Day 14 | 8.3 | 43.3 | 80.8 | 38 |
| Day 15 | 5.9 | 41.1 | 85.6 | 48 |

TABLE 7

Averaged Ammonia Emissions at Exhaust Fan Inlets Measured When the Pit Fan Ventilation Fans Were Activated.

| Date | Amended Feed | Control | % Reduction | Outside Temperature |
|---|---|---|---|---|
| Day 1 | 37.7 | 56.1 | 32.8 | 48 |
| Day 2 | 34.8 | 57.3 | 39.3 | 48 |
| Day 3 | 27.6 | 50 | 44.8 | 49 |
| Day 4 | 12.1 | 30.7 | 60.6 | 56 |
| Day 5 | 30.6 | 42 | 27.1 | 62 |
| Day 6 | 23.1 | 36.1 | 36.0 | 50 |
| Day 7 | 22.5 | 40.9 | 45.0 | 54 |
| Day 8 | 21.4 | 45.9 | 53.4 | 47 |

TABLE 7-continued

Averaged Ammonia Emissions at Exhaust Fan Inlets Measured When the Pit Fan Ventilation Fans Were Activated.

| Date | Amended Feed | Control | % Reduction | Outside Temperature |
|---|---|---|---|---|
| Day 9 | 16.2 | 27.9 | 41.9 | 57 |
| Day 10 | 21.1 | 38.9 | 45.8 | 42 |

TABLE 8

Fly Count Data: Gypsum/Zeolite Amended Feed vs. Conventional Industry Standard Diet.

|  | Amended Feed | Control |
|---|---|---|
| Week 1 | 1.2 | 1.2 |
| Week 2 | 1.8 | 1.6 |
| Week 3 | 1.8 | 1.4 |
| Week 4 | 1.8 | 2.2 |
| Week 5 | 1.8 | 1.8 |
| Week 6 | 1.8 | 2.2 |
| Week 7 | 1.8 | 2.6 |
| Week 8 | 1.8 | 2 |
| Week 9 | 1.6 | 2 |
| Week 10 | 1.8 | 2.2 |
| Week 11 | 1.2 | 2.8 |
| Week 12 | 1.4 | 2.4 |
| Week 13 | 1.2 | 2.8 |
| Week 14 | 1.6 | 2.8 |
| Week 15 | 1.4 | 3 |
| Week 16 | 1.8 | 3.2 |

While the invention has been illustrated and described in detail in the figures and foregoing description, the same is to be considered as illustrative and not restrictive in character, it being understood that only the preferred embodiments have been shown and described and that all changes and modifications that come within the spirit of the invention are desired to be protected. As well, while the invention was illustrated using specific examples, theoretical arguments, accounts, and illustrations, these illustrations and the accompanying discussion should by no means be interpreted as limiting the invention. All patents, patent applications, and references to texts, scientific treatises, publications, and the like referenced in this application are incorporated herein by reference in their entirety.

The invention claimed is:

1. An animal feed for fowl comprising:
    a. a cation exchanger capable of passing through a fowl's digestive system, becoming a component of manure from the fowl, and binding ammonium cations therein, wherein said cation exchanger also includes exchangeable phosphate-reactive metal cations;
    b. an acidogenic compound, wherein said acidogenic compound lowers a pH of said manure, said manure including ammonia, produced by a fowl fed said animal feed such that at least a portion of the ammonia in said manure is protonated to produce said ammonium cations; and
    c. a feed component.

2. The animal feed of claim 1, wherein said cation exchanger retains ammonium cation binding capacity after passage of said cation exchanger through a digestive tract of a fowl.

3. The animal feed of claim 2, wherein said cation exchanger is zeolite.

4. The animal feed of claim 3, wherein said zeolite comprises between about 1.25 to about 2.0 weight percent of said animal feed.

5. The animal feed of claim 3, wherein said zeolite comprises about 1.25 weight percent of said animal feed.

6. The animal feed of claim 1, wherein said fowl is chicken.

7. The animal feed of claim 1, wherein said acidogenic compound is present in said animal feed in an amount sufficient to produce manure with a pH <9.3.

8. The animal feed of claim 1, wherein said acidogenic compound is present in said animal feed in an amount sufficient to produce manure with a pH <7.

9. The animal feed of claim 1, wherein said acidogenic compound is selected from the group consisting of lysine, benzoic acid, salts of benzoic acid, salts of carboxylic acids, cellulose, alkaline earth metal salts of mineral acids, and other salts of mineral acids.

10. The animal feed of claim 1, wherein said acidogenic compound is selected from the group consisting of chloride, phosphate, sulfate, nitrate, cellulose, and benzoate.

11. The animal feed of claim 1, wherein said acidogenic compound is selected from the group of acidogenic compounds consisting of ammonium benzoate and other salts of benzoic acid.

12. The animal feed of claim 1, further including an electrolyte.

13. The animal feed of claim 12, wherein said electrolyte is selected from the group consisting of ammonium chloride, alkaline earth metal salts of mineral acids, and other salts of mineral acids.

14. The animal feed of claim 1, further including gypsum.

15. The animal feed of claim 14, wherein gypsum supplies ≦66 percent of supplemental calcium present in said animal feed.

16. The animal feed of claim 14, wherein the amount of gypsum in said animal feed is such that said gypsum supplies ≦50 percent of supplemental calcium present in said animal feed.

17. The animal feed of claim 1, wherein said phosphate reactive metal is selected from the group consisting of calcium and magnesium.

18. The animal feed of claim 1, further including phytase.

19. The animal feed of claim 1, further including a source of crude protein, wherein the amount of said crude protein is such that at least one amino acid in said animal feed is limiting.

20. The animal feed of claim 19, further including an amino acid supplement having at least one amino acid selected from the group consisting of lysine, methionine, threonine, and tryptophan.

21. An animal feed for fowls comprising: a cation exchanger capable of passing through a fowl's digestive system, becoming a component of manure from the fowl, and binding ammonium cations therein, wherein said cation exchanger also includes exchangeable phosphate-reactive metal cations; an acidogenic compound, and a feed component_wherein said acidogenic compound lowers a pH of a manure, said manure including ammonia, produced by a fowl fed said animal feed such that at least a portion of the ammonia in said manure is protonated to produce ammonium cations and such that said manure produces a first level of a first aerosol ammonia that is substantially lower than a second level of a second aerosol ammonia produced by a manure produced by said fowl fed a conventional industry standard diet.

22. An animal ration for fowls amended to provide a first manure produced by a fowl fed the amended animal ration, the first manure having a pH and a high N:P relative to a second manure provided by the fowl fed a conventional industry standard diet, wherein the first and second manures have a pH and contain ammonia, the amended animal ration comprising:
   (a) a reduced total amount of crude protein in the amended animal ration relative to a total amount of crude protein contained in the conventional industry standard diet;
   (b) a cation exchanger capable of passing through a fowl's digestive system, becoming a component of manure from the fowl, and binding ammonium cations therein, wherein said cation exchanger also includes exchangeable phosphate-reactive metal cations;
   (c) an acidogenic compound capable of lowering the pH of the manure and producing ammonium cations therein;
   (d) phytase; and
   (e) a reduced total amount of phosphate in the amended animal ration relative to a total amount of phosphate contained in the conventional industry standard diet.

23. The animal ration of claim 22, wherein the phosphate reactive metal is selected from the group consisting of calcium, magnesium, and a combination thereof.

* * * * *